US007687192B2

(12) United States Patent
Yoon et al.

(10) Patent No.: US 7,687,192 B2
(45) Date of Patent: Mar. 30, 2010

(54) MECHANICALLY AND ELECTRICALLY CONNECTING MEMBER

(75) Inventors: Junill Yoon, Seoul (KR); Jong-yul Ro, Seoul (KR); Do Yang Jung, Hwaseong-si (KR); Jisang Yu, Daejeon (KR)

(73) Assignee: LG Chem, Ltd. (KR)

( * ) Notice: Subject to any disclaimer, the term of this patent is extended or adjusted under 35 U.S.C. 154(b) by 1015 days.

(21) Appl. No.: 11/406,884

(22) Filed: Apr. 19, 2006

(65) Prior Publication Data

US 2006/0246773 A1 Nov. 2, 2006

(30) Foreign Application Priority Data

Apr. 19, 2005 (KR) .................. 10-2005-0032500

(51) Int. Cl.
*H01M 2/10* (2006.01)
*H01M 6/42* (2006.01)
*H01R 4/66* (2006.01)
*H01R 13/648* (2006.01)
*H01R 3/00* (2006.01)
*H01R 31/08* (2006.01)
*H01R 4/50* (2006.01)
*B60R 16/04* (2006.01)

(52) U.S. Cl. .................. 429/96; 429/159; 439/97; 439/500; 439/507; 439/801; 180/68.5

(58) Field of Classification Search ............ 429/96, 429/159; 439/97, 500, 507, 801; 105/50, 105/51, 52, 53, 54, 55, 56, 57, 58, 59; 180/68.5
See application file for complete search history.

(56) References Cited

U.S. PATENT DOCUMENTS 6,025,996 A * 2/2000 Vacheron et al. ............ 361/774

6,211,646 B1 * 4/2001 Kouzu et al. ................ 320/107

FOREIGN PATENT DOCUMENTS

KR 10-2006-0072922 6/2006
KR 10-2006-0090469 8/2006
WO WO 2004082044 A1 * 9/2004

* cited by examiner

*Primary Examiner*—Jerry Lorengo
*Assistant Examiner*—Eli Mekhlin
(74) *Attorney, Agent, or Firm*—Cantor Colburn LLP

(57) ABSTRACT

Disclosed herein is a member for mechanically and electrically connecting two or more objects, including an insulation body having a plurality of coupling holes for coupling the objects formed therein, a plate-shaped conductive strip mounted at the rear surface of the insulation body in the diagonal direction of the insulation body while the conductive strip is isolated from the front surface of the insulation body, the conductive strip having connection holes formed at opposite ends thereof such that the connection holes communicate with the insulation body, and a connecting bar constructed such that the connecting bar can be inserted into the corresponding connection hole of the conductive strip while the strip is connected to the objects. The connecting member accomplishes excellent mechanical connection and stable electrical connection of objects, easy assembly and disassembly, and low possibility of short circuits. Furthermore, the objects can be connected with each other in a compact structure, and therefore, the connecting member according to the present invention can be preferably used to connect battery modules constituting a medium- or large-sized battery system, especially, for electric vehicles or hybrid electric vehicles.

8 Claims, 7 Drawing Sheets

MECHANICALLY AND ELECTRICALLY CONNECTING MEMBER

FIELD OF THE INVENTION

The present invention relates to a member for mechanically and electrically connecting two or more objects, and, more particularly, to a member for mechanically and electrically connecting two or more objects, comprising: an insulation body having a plurality of coupling holes for coupling the objects formed therein; a plate-shaped conductive strip mounted at the rear surface of the insulation body in the diagonal direction of the insulation body while the conductive strip is isolated from the front surface of the insulation body, the conductive strip having connection holes formed at opposite ends thereof such that the connection holes communicate with the insulation body; and a connecting bar constructed such that the connecting bar can be inserted into the corresponding connection hole of the conductive strip while the strip is connected to the objects.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery system having a plurality of cells electrically connected with each other because high output and large capacity is necessary for the medium- or large-sized devices. Generally, a battery module is manufactured by mechanically and electrically connecting a plurality of battery cartridges having unit cells, the mechanical characteristics of which are low, mounted therein, and a plurality of battery modules are connected with each other, whereby such a medium- or large-sized battery system is manufactured.

It is required that the medium- or large-sized battery system have a compact structure, if possible, depending upon the characteristics of a device to which the battery system is applied and that the battery system have excellent mechanical properties and stable electrical connection. It is possible that a great external force is applied to a particular device, such as an electric vehicle and a hybrid electric vehicle, during the operation of the device. As a result, a great external force is also applied to a battery system used in the device.

When a housing is used to improve mechanical and electrical connection such that the battery system can be mounted in the housing, however, the overall size and weight of the system are increased, which is not desirable.

Consequently, when a unit for electrically connecting components of the battery system can also be used as a unit for mechanically connecting the components of the battery system, the compact structure may be realized. Some conventional arts have proposed connecting members having various structures. However, most of the connecting members may be easily damaged when an external force is applied to the connecting members.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have developed a connecting member having a specific structure, and have found that the connecting member enables the manufacture of a compact-structured battery system having a plurality of battery modules, and, when an external force is applied to the battery system, the possibility of damage to the electrical connection of the battery system is greatly reduced through the efficient distribution of the force. Also, the inventors of the present invention have found that the connecting member can be preferably used for objects required to be mechanically and electrically connected with each other as well as a medium- or large-sized battery system.

Consequently, it is an object of the present invention to provide a connecting member enabling compact and excellent mechanical connection as well as stable electrical connection.

It is another object of the present invention to provide a medium- or large-sized battery system manufactured using the connecting member.

In accordance with one aspect of the present invention, the above and other objects can be accomplished by the provision of a member for mechanically and electrically connecting two or more objects, comprising: an insulation body having a plurality of coupling holes for coupling the objects formed therein; a plate-shaped conductive strip mounted at the rear surface of the insulation body in the diagonal direction of the insulation body while the conductive strip is isolated from the front surface of the insulation body, the conductive strip having connection holes formed at opposite ends thereof such that the connection holes communicate with the insulation body; and a connecting bar constructed such that the connecting bar can be inserted into the corresponding connection hole of the conductive strip while the strip is connected to the objects.

According to the present invention, the insulation body is positioned such that the connecting bar, which is integrally formed at or coupled to each object required to be mechanically and electrically connected, can be inserted into the connection hole, and is then coupled to the objects through the coupling holes using coupling units, such as bolts and nuts, thereby accomplishing mechanical and electrical connection of the objects. Consequently, the assembly and disassembly of the objects are very easily carried out. The mechanical connection between the objects is mainly accomplished by the insulation body, and the electrical connection between the objects is accomplished by the conductive strip. As a result, when an external force is applied to the objects, the electrical connection between the objects is not easily broken, the compact connection between the objects is accomplished. Furthermore, distinction between cathode and anode terminals is easily made, and therefore, the possibility of short circuit during the operation is greatly reduced.

The material for the insulation body and the conductive strip is not particularly restricted so long as the insulation body and the conductive strip can provide proper mechanical strength. For example, the insulation body may be made of a plastic material, such as acrylonitrile-butadiene-styrene (ABS) resin, polycarbonate (PC), polyethylene terephthalate (PET) resin, or nylon, which has excellent tensile strength and impact resistance. The conductive strip may be made of a metal material. Also, the shape of the insulation body is not particularly restricted. Preferably, the insulation body may be constructed in a hexahedral structure.

In a preferred embodiment, a mounting groove is formed at the rear surface of the insulation body. The mounting groove has a shape approximately corresponding to the shape of the conductive strip. The strip is mounted to the insulation body in the state that the strip is inserted in the mounting groove.

The connecting bar assists to mount the conductive strip to the insulation body, and reinforces the electrical contact between the electrical connection part of the object (for example, the bus bar of the battery module) and the conductive strip. According to circumstances, the connecting bar may be made of a conductive material so that the connecting bar can assist with the electrical connection of the conductive strip. For example, a thread part(s) may be formed at the upper end or the opposite ends of the connecting bar such that a coupling unit(s), such as a nut(s), can be threadedly engaged with the thread part(s). Consequently, the contact force between the electrical connection part of the object and the conductive strip is increased, and the coupling force between the insulation body and the object is also increased.

One of the characteristics of the present invention is that the conductive strip is mounted at the rear surface of the insulation body in the diagonal direction of the insulation body. It is preferable to reduce the length of the connecting member in order to accomplish a compact mechanical connection between two objects. In the case that the electrical connection parts of the objects are connected with each other by the connecting unit (the conductive strip of the present invention) in the horizontal direction, excessive load is applied to the conductive strip when an external force is applied to the objects or the connecting member, with the result that the conductive strip is easily broken. According to the present invention, since the conductive strip is in contact with the electrical connection parts (for example, the bus bars) of the object in the diagonal direction of the insulation body, a force causing breakage or distortion is not directly applied to the conductive strip when an external force is applied to the connecting member. Consequently, the compact mechanical connection between the two objects as well as the stable electrical connection between the two objects is accomplished.

In a preferred embodiment, some or all of the rear surface of the conductive strip may protrude from the rear surface of the insulation body in the state that the conductive strip is mounted to the rear surface of the insulation body. The electrical connection between the conductive strip and the object to be connected is further improved by the rearward protruding structure.

The connecting member according to the present invention may be used for various purposes. Especially, the connecting member may be preferably used when battery modules are connected with each other to manufacture a medium- or large-sized battery system having a compact and stable structure. Particularly, it is preferable that a battery system for electric vehicles and hybrid electric vehicles be constructed in a compact structure in consideration of the necessity for high output and large capacity of the battery system and the size of the battery system in a vehicle. Also, a large external force may be applied to the battery system during the operation of the vehicle. Consequently, it is particularly required to maintain the mechanical and electrical connection of the battery system.

In a preferred embodiment, the present invention provides a high-output and large-capacity battery system having two or more battery modules coupled with each other, each battery module including a module case for receiving a plurality of battery cartridges through an open front part thereof, and a front plate mounted to the open front part of the module case for electrically connecting the battery cartridges, wherein each front plate is provided at opposite sides thereof with indentions having size and shape approximately corresponding to the size and the shape of a connecting member when the front plate is connected with the front plate of the adjacent battery module, each module case is provided at opposite sides of the front part thereof corresponding to the indentions of the front plate with connection grooves, into which the connecting bar of the connecting member is inserted, and a plurality of coupling grooves for other coupling units, and the connecting member is inserted into the indentions and the connecting member is coupled to the module cases by means of the coupling units in the state that the battery modules are arranged adjacent to each other, thereby accomplishing mechanical and electrical connection of the battery modules.

The details of the battery cartridge, in which two or more unit cells are mounted, of the high-output and large-capacity battery system according to the present invention is disclosed in Korean Patent Application 2004-111699, which has been filed in the name of the applicant of the present application. Also, the details of the front plate mounted to the open front part of the module case for electrically connecting the battery cartridges is disclosed in Korean Patent Application 2005-11380, which has been filed in the name of the applicant of the present application. Consequently, detailed descriptions thereof will not be given, and the entire disclosures of the above-mentioned patent applications are incorporated herein by reference.

After synthetically considering the entire disclosures of the patent application and the specification of the present invention, the medium- or large-sized battery system according to the present invention provides the very compact structure and the excellent mechanical and electrical connection.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

Figure 1:
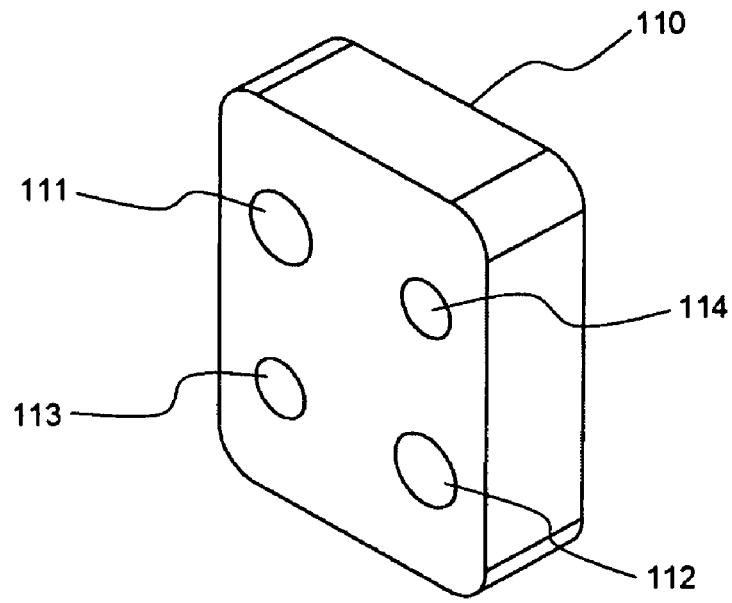
FIGS. 1 to 3 are a perspective view, a rear view, and a side view respectively illustrating an insulation body of a connecting member according to a preferred embodiment of the present invention.

100: connecting member 110: insulation body
120: conductive strip 130: connecting bar
200: battery module 210: module case
220: front plate

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 2:
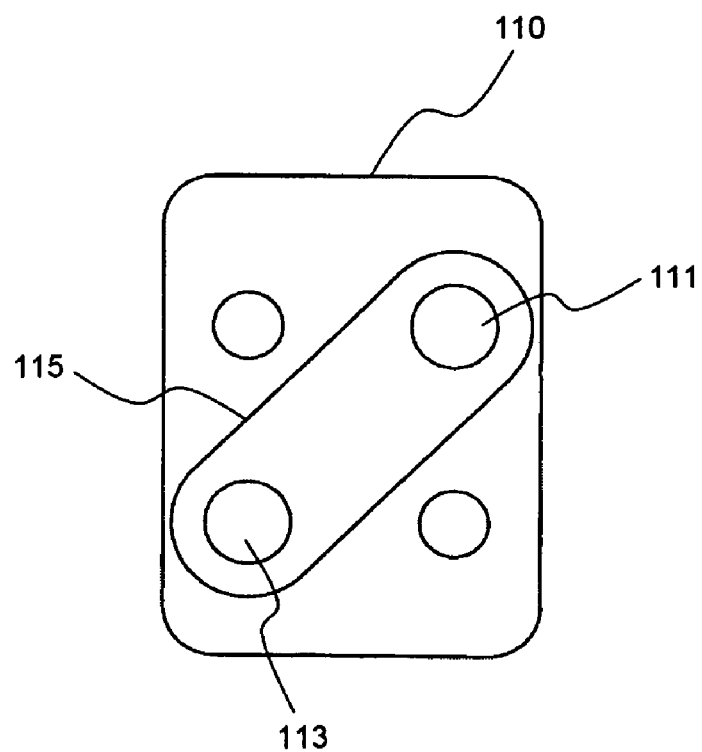
Figure 3:
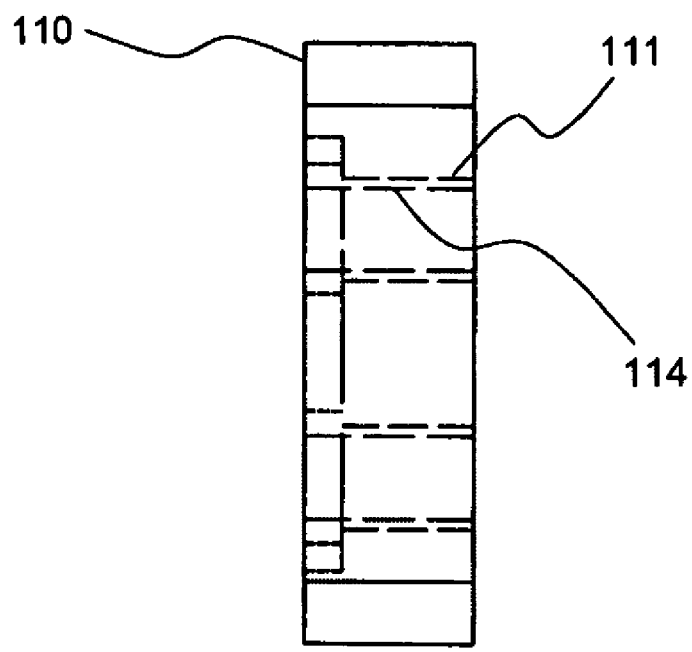
Figure 4:
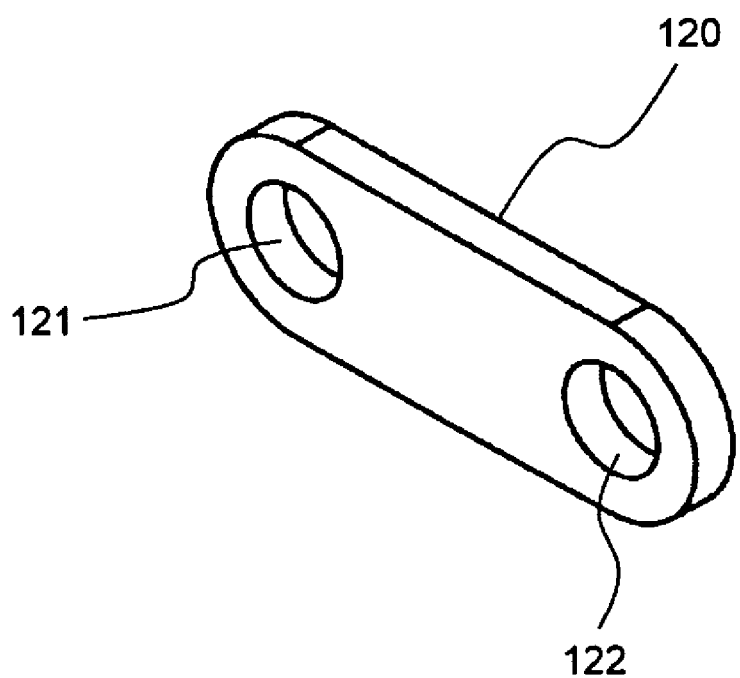
FIG. 4 is a perspective view illustrating a conductive strip of a connecting member according to a preferred embodiment of the present invention.

FIGS. 1 to 3 are a perspective view, a rear view, and a side view respectively illustrating an insulation body of a connecting member according to a preferred embodiment of the present invention, and FIG. 4 is a perspective view illustrating a conductive strip of a connecting member according to a preferred embodiment of the present invention.

Figure 6:
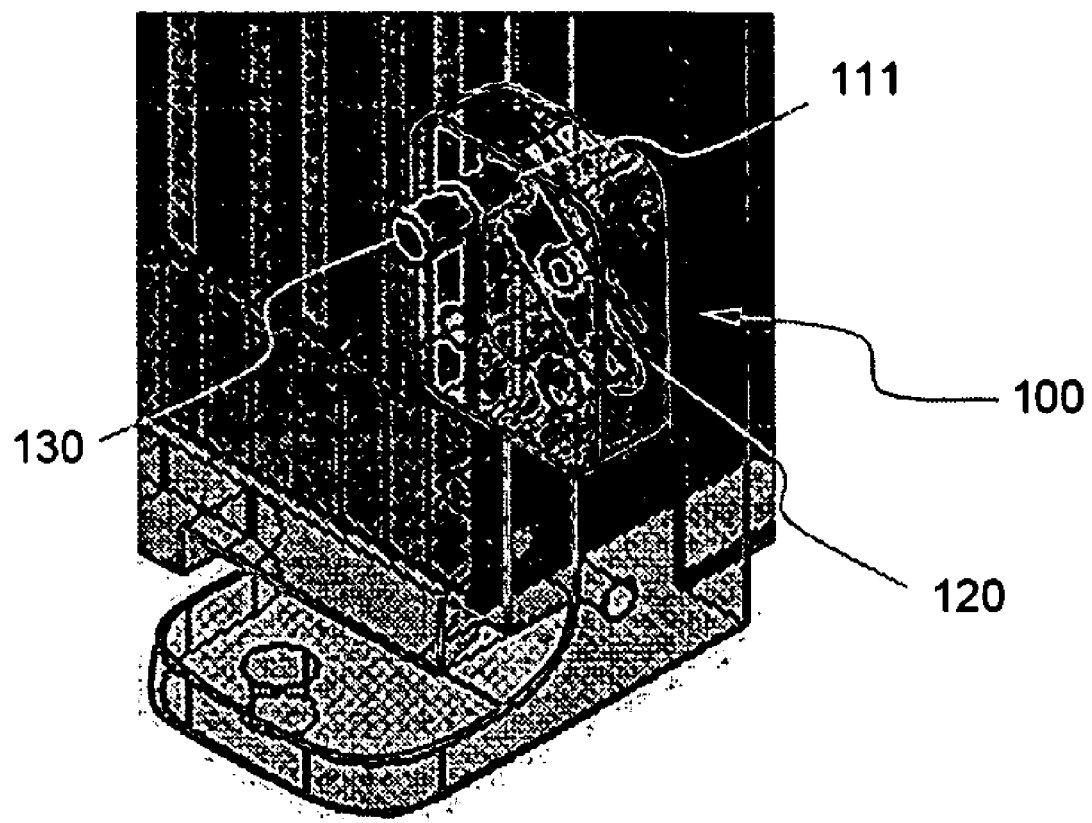
FIG. 6 is a partial see-through view illustrating part A of the battery module shown in FIG. 5.

Referring to these drawings, the mechanically and electrically connecting member according to the present invention comprises: an insulation body 110 formed in the shape of a rectangle; a conductive strip 120 formed in the shape of a plate; and a connecting bar 130 (see FIG. 6).

Preferably, the insulation body 110 is made of plastic resin having high tensile strength and high dimensional stability, and the insulation body 110 is generally formed in the shape of a rectangular parallelepiped. Also, two connection holes 111 and 112 are diagonally formed in the insulation body 110, and two coupling holes 113 and 114 are diagonally formed in the insulation body 110 such that a line connecting the two coupling holes 113 and 114 is perpendicular to a line connecting the two connection holes 111 and 112. At the rear surface of the insulation body 110 is formed a mounting groove 115 having a shape approximately corresponding to the shape of the conductive strip 120 in the direction where the two connection holes 111 and 112 are arranged. Preferably, the conductive strip 120 has a thickness slightly greater than the depth of the mounting groove 115. Consequently, when the conductive strip 120 is inserted into the mounting groove 115 of the insulation body 110, the rear surface of the conductive strip 120 slightly protrudes from the rear surface of the insulation body 110, whereby electrical connection with an object (not shown) is more stably guaranteed.

The conductive strip 120 is a plate-shaped metal strip having a slightly larger thickness. Opposite ends of the conductive strip 120 are rounded, and connection holes 121 and 122 are formed in the conductive strip 120 adjacent to the rounded opposite ends of the conductive strip 120. Consequently, when the conductive strip 120 is inserted into the mounting groove 115 of the insulation body 110, the connection holes 121 and 122 of the conductive strip 120 are aligned with the connection holes 111 and 112 of the insulation body 110.

Figure 5:
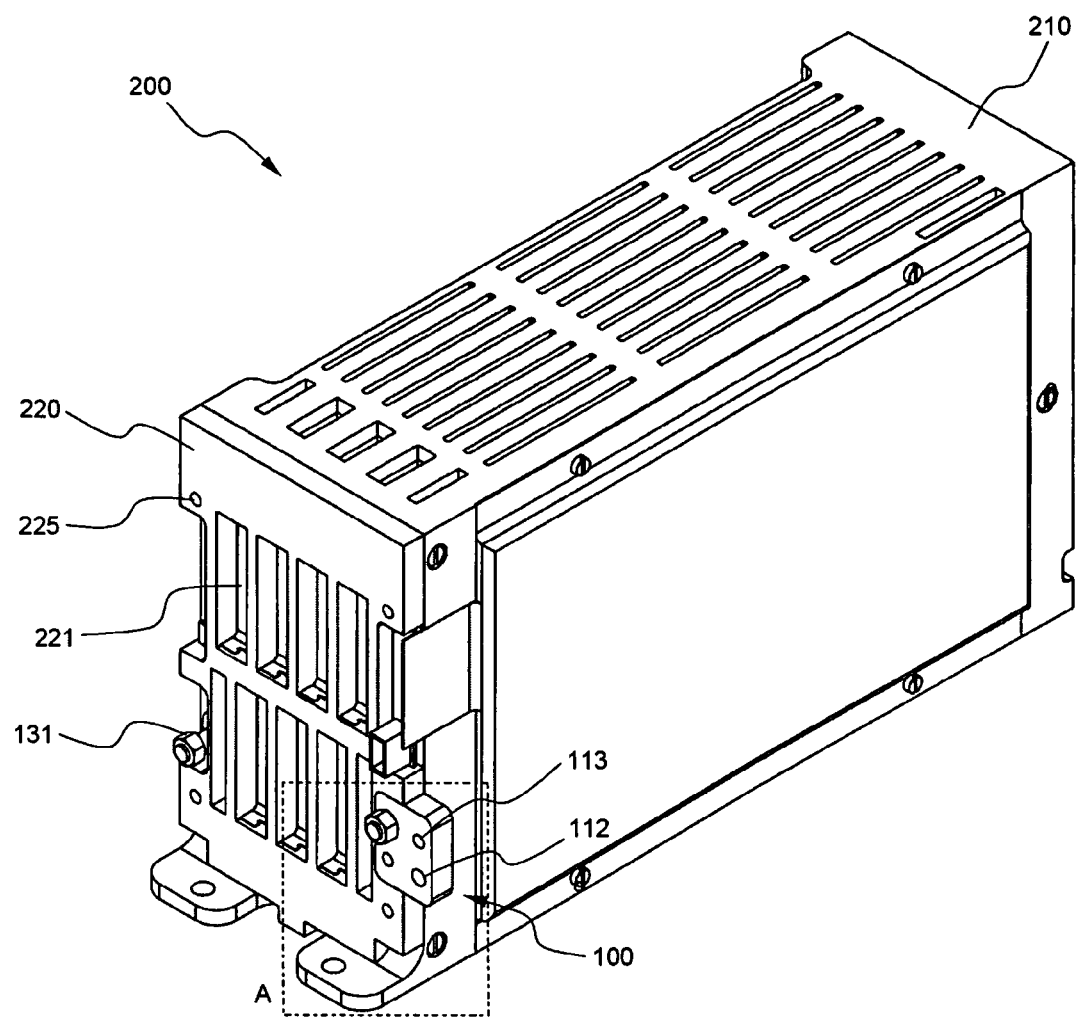
FIG. 5 is a perspective view illustrating a battery module constituting a medium- or large-sized battery system according to the present invention.

FIG. 5 is a perspective view typically illustrating a battery module constituting a medium- or large-sized battery system according to the present invention, and FIG. 6 is a partial see-through view typically illustrating part A of the battery module shown in FIG. 5

Referring to FIGS. 5 and 6, the battery module 200 comprises: a module case 210 having a plurality of battery cartridges (not shown) mounted therein; a front plate 220 mounted to an open front part of the module case 210; and a connecting member 100 for mechanically and electrically connecting two or more battery modules 200.

Figure 7:
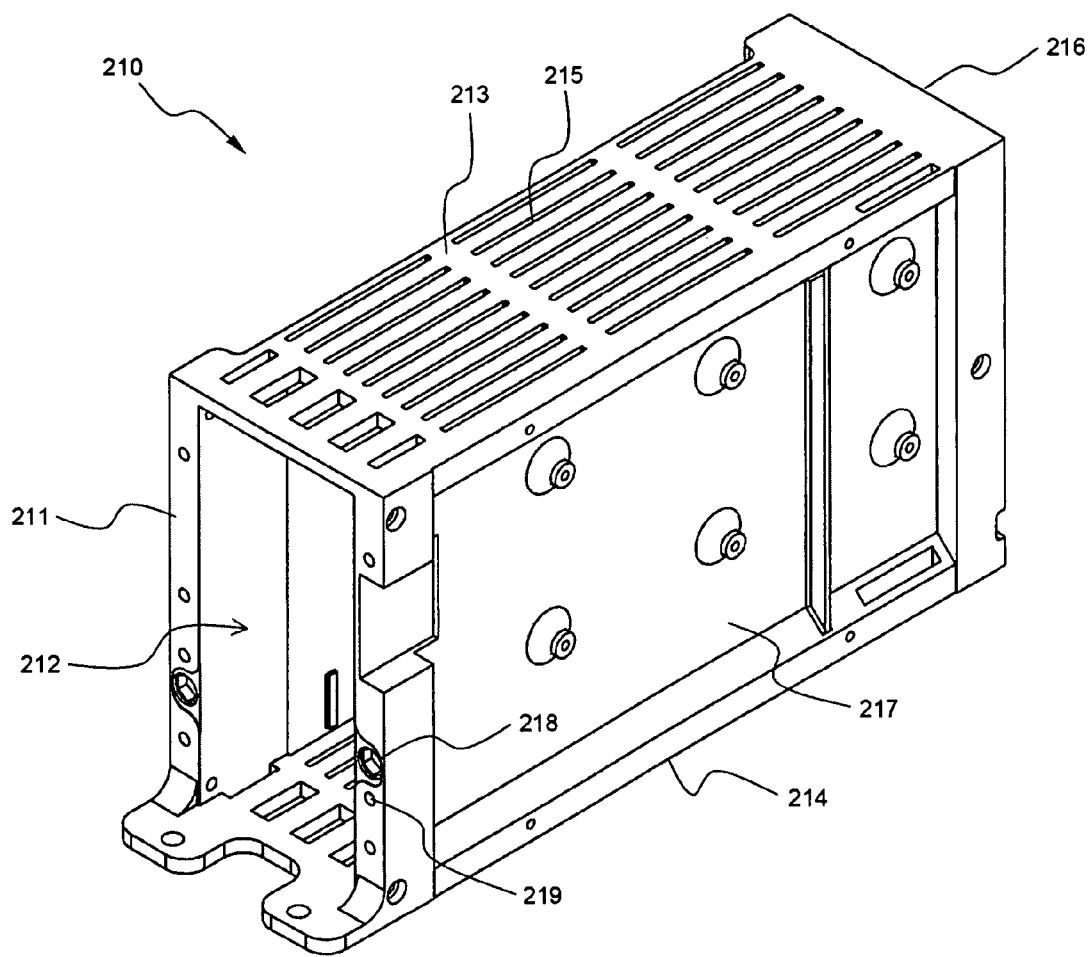
FIG. 7 is a perspective view illustrating a module case constituting the battery module of FIG. 5.

The details of the module case 210 will be described below with reference to FIG. 7.

The module case 210 has an open front part 211 and an inner space 212 in which the plurality of battery cartridges (not shown) are mounted. The module case 210 is generally constructed in a box-shaped structure. In the upper end 213 and the lower end 214 of the module case 210 are formed pluralities of elongated through-holes 215, which communicate with the inner space 212 of the module case 210. According to circumstances, the elongated through-holes may be formed in the rear part of the module case 210. At the side part 217 of the module case 210 is mounted a battery management system (BMS) (not shown). At each side of front part of the module case 210 are formed a connection groove 218, into which the connecting bar 130 (see FIG. 6) of the connecting member 100 (see FIG. 6) is inserted, and a plurality of coupling grooves 219. The connection groove 218 is formed in an angled structure corresponding to the shape of the lower end of the connecting bar 130 (see FIG. 6). Consequently, when a nut 131 (see FIG. 15) is threadedly engaged with the threaded upper end of the connecting bar 130 in the state that the connecting bar 130 is inserted in the connection groove, the idle rotation of the connecting bar 130 is effectively prevented.

Referring back to FIGS. 5 and 6, bus bars 221 and a printed circuit board (PCB) (not shown), which provided for electrical connection between the battery cartridges, are mounted at the rear surface of the front plate 220, which is mounted to the open front part of the module case 210. The front plate is shown in FIG. 8 with the bus bars and the PCB being not mounted thereto.

Figure 8:
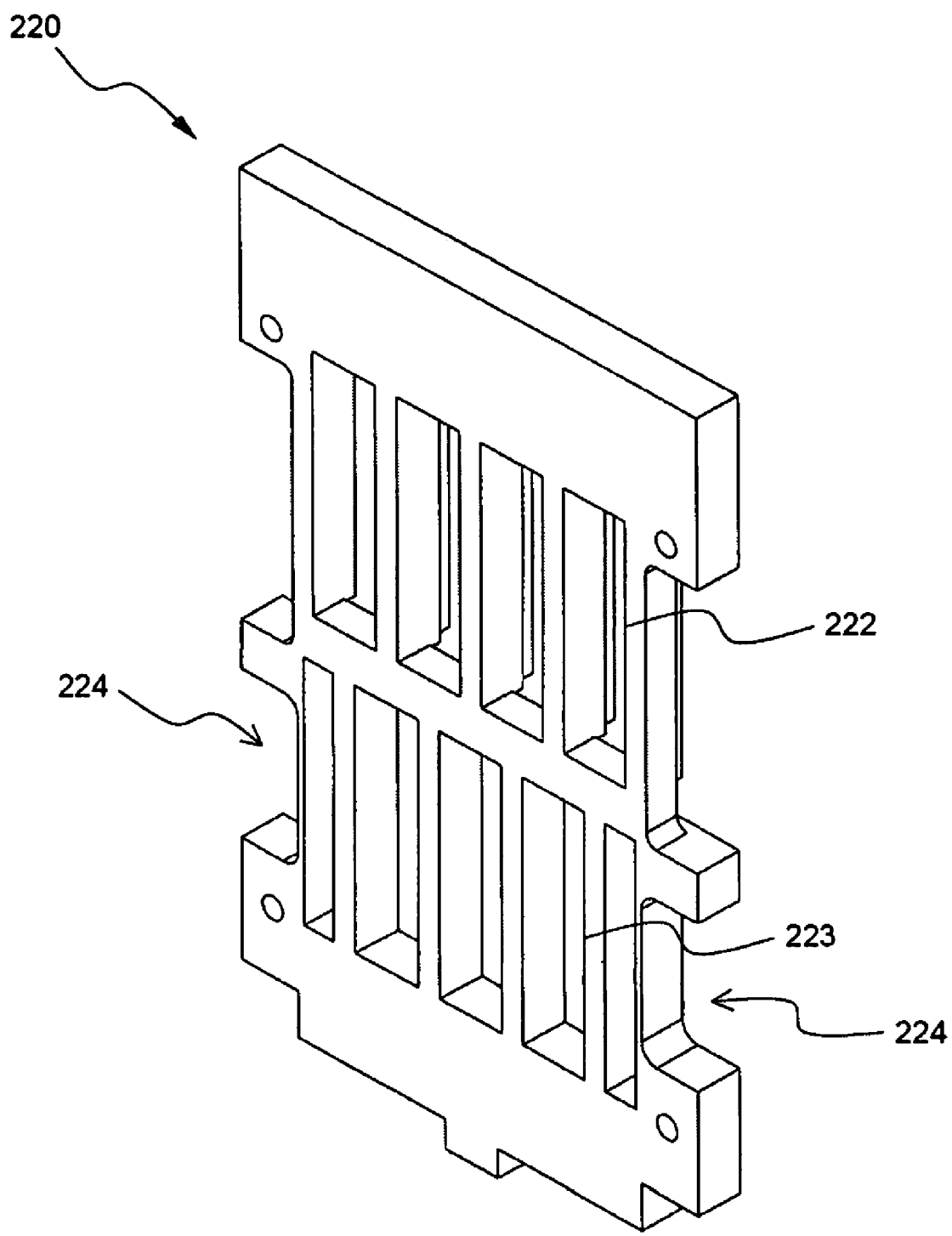
FIG. 8 is a perspective view illustrating a front plate constituting the battery module of FIG. 5.

Referring to FIG. 8, the front plate 220 is a thick plate-shaped member. An upper opening array 222 and a lower opening array 223, in which the bus bars 221 (see FIG. 5) are mounted, are formed in the middle of the front plate 220. At the lower opposite sides of the front plate 220 are formed indentions 224. The upper opening array 222 and the lower opening array 223 are arranged in an alternating structure, the details of which are described in the previously mentioned Korean Patent Application No. 2005-11380, and therefore, a detailed description thereof will not be given.

When two battery modules are arranged adjacent to each other, one of the indentions 224 forms a space having size and shape sufficient for the connecting member 100 (see FIG. 5) to be inserted thereinto together with corresponding one of the indentions of an adjacent front plate (not shown). Consequently, the size and shape of the space formed by the two adjacent indentions 224 is approximately identical to the size and shape of the connecting member. When two battery modules are arranged while being slightly spaced apart from each other, however, the size of the space formed by the two adjacent indentions 224 may be slightly less than that of the corresponding connecting member in consideration of the spaced distance.

Referring back to FIGS. 5 and 6, it can be seen that the connecting member 100 is coupled to the battery module 200. The positions of the connection bars 130 at the opposite sides of the battery module 200 are different in correspondence to the connection holes 111 and 112 diagonally formed in the insulation body 110 of the connecting member 100. Specifically, the position of the right-side connecting bar 130 is higher by the difference in height between the connection holes 111 and 112 than that of the left-side connecting bar 130. Preferably, each connecting bar 130 may be formed in the shape of a bolt having an angled lower end and a threaded upper end. Consequently, the angled lower end of the connecting bar 130 is inserted into the connection groove 218 (see FIG. 7), and the nut 131 is threadedly engaged with the thread upper end of the connecting bar 130, whereby the electrical contact between the conductive strip 120 and the corresponding bus bar 211 of the battery module 200 is reinforced.

The coupling of the connecting member 100 to the module case 210 and the coupling of the front plate 220 to the module case 210 are accomplished by the threaded engagement of bolts (not shown) into the coupling grooves 113 and 225 formed at the connecting member 100 and the front plate 220, respectively. However, the coupling of the connecting member 100 to the module case 210 and the coupling of the front plate 220 to the module case 210 are not limited to the threaded engagement using bolts.

Figure 9:
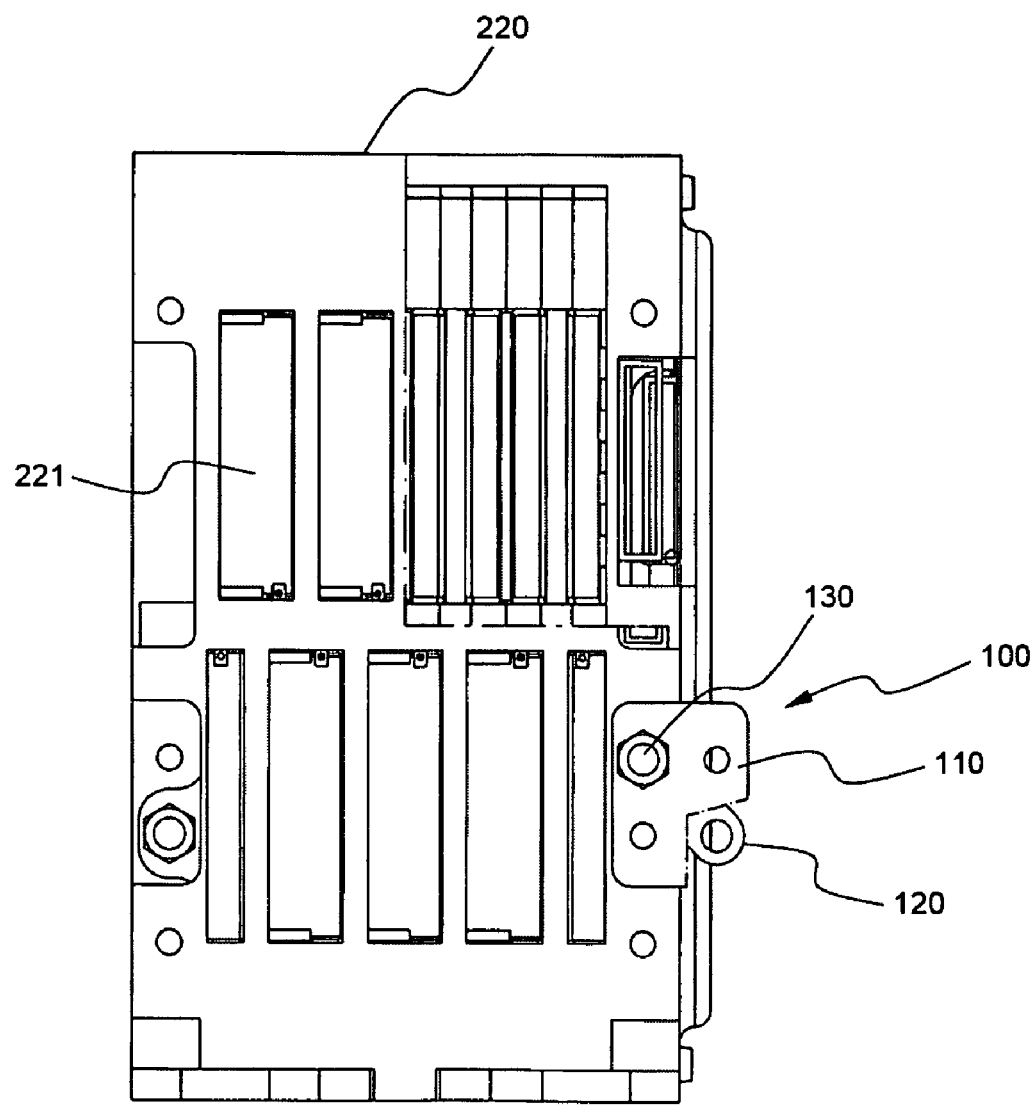
FIG. 9 is a partially exploded front view illustrating the battery module of FIG. 5.

FIG. 9 is a partially exploded front view typically illustrating the battery module with the front plate and the connecting member being coupled to the module case.

Referring to FIG. 9, the conductive strip 120 of the connecting member 100 is located at the rear surface of the insulation body 110, which means that the conductive strip 120 is isolated from the outside, whereby occurrence of short circuits and occurrence of corrosion due to moisture are effectively prevented. The conductive strip 120 is electrically connected to the corresponding bus bar 221 of the front plate 220. According to circumstances, the connecting bar 130 may be made of a conductive material, and the connecting bar 130 may be electrically connected to the corresponding bus bar 221 of the front plate 220, thereby assisting in the electrical connection through the conductive step 120. The mechanical coupling between the battery modules 200 is mainly accomplished by the insulating body 110, and the conductive strip 120 for the electrical connection is disposed in an inclined state (in the diagonal direction of the insulating body), not in a horizontal state. Consequently, when an external force is applied to the battery module 200, the external force is appropriately distributed, and therefore, the possibility of damage to or distortion of the battery module is low.

A plurality of battery modules 200 having the above-described construction are connected to manufacture a high-output and large-capacity battery system. This battery system is very useful as a power source for electric vehicles, especially, hybrid electric vehicles.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the connecting member according to the present invention accomplishes excellent mechanical connection and stable electrical connection of objects, easy assembly and disassembly, and low possibility of short circuits. Furthermore, the objects can be connected with each other in a compact structure, and therefore, the connecting member according to the present invention can be preferably used to connect battery modules constituting a medium- or large-sized battery system, especially, for electric vehicles or hybrid electric vehicles.

What is claimed is:

1. A connection member for mechanically and electrically connecting two or more battery modules, the connection member comprising:

an insulation body having a plurality of coupling holes, a plurality of connection holes, a front surface and an opposite rear surface and a mounting groove, the mounting groove formed at the rear surface of the insulation body;

a plate-shaped conductive strip, which connects battery modules, the plate-shaped conductive strip mounted at the rear surface of the insulation body in a diagonal direction of the insulation body and in the mounting groove, wherein the conductive strip is electrically insulated from the front surface of the insulation body, the conductive strip includes connection holes formed at opposite ends thereof, and wherein the connection holes of the conductive strip communicate with the connection holes of the insulation body; and a connecting bar, which can be inserted into a corresponding connection hole of the conductive strip and a corresponding connection hole of the insulation body, wherein the mounting groove has a shape that corresponds to a shape of the conductive strip and the conductive strip is mounted to the insulation body by mechanical coupling.

2. The connecting member according to claim 1, wherein the insulation body is made of a plastic material, and the conductive strip is made of a metal material.

3. The connecting member according to claim 1, wherein at least a portion of the rear surface of the conductive strip protrudes from the rear surface of the insulation body and the conductive strip is mounted to the rear surface of the insulation body.

4. The connecting member according to claim 1, wherein the connecting bar has a threaded upper end or threaded opposite ends such that an additional coupling unit can be coupled to the connecting bar.

5. The connecting member according to claim 4, wherein the connecting bar is formed in the shape of a bolt having an angled lower end and a threaded upper end.

6. A medium- or large-sized battery system having two or more battery modules coupled with each other, each battery module including a module case for receiving a plurality of battery cartridges through an open front part thereof, and a front plate mounted to the open front part of the module case for electrically connecting the battery cartridges, wherein each front plate is provided at opposite sides thereof with indentions having size and shape approximately corresponding to the size and the shape of the connecting member according to claim 1 when the front plate is connected with the front plate of the adjacent battery module, each module case is provided at opposite sides of the front part thereof corresponding to the indentions of the front plate with connection grooves, into which the connecting bar of the connecting member is inserted, and a plurality of coupling grooves for other coupling units, and the connecting member is inserted into the indentions and the connecting member is coupled to the module cases by means of the coupling units in the state that the battery modules are arranged adjacent to each other, thereby accomplishing mechanical and electrical connection of the battery modules.

7. The battery system according to claim 6, wherein the connection grooves formed at the opposite sides of the front part of each module case are constructed in an angled structure.

8. The battery system according to claim 6, wherein the battery system is used as a power source for electric vehicles or hybrid electric vehicles.

* * * * *